United States Patent
Sagishima

(10) Patent No.: US 7,577,335 B2
(45) Date of Patent: Aug. 18, 2009

(54) DIGITAL BROADCASTING RECEIVING/RECORDING APPARATUS

(75) Inventor: Norihiro Sagishima, Cupertino, CA (US)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 790 days.

(21) Appl. No.: 10/480,063

(22) PCT Filed: Jun. 21, 2002

(86) PCT No.: PCT/JP02/06257

§ 371 (c)(1),
(2), (4) Date: Dec. 8, 2003

(87) PCT Pub. No.: WO03/003734

PCT Pub. Date: Jan. 9, 2003

(65) Prior Publication Data

US 2004/0197074 A1    Oct. 7, 2004

(30) Foreign Application Priority Data

Jun. 27, 2001    (JP) .............................. 2001-195071

(51) Int. Cl.
    H04N 5/781    (2006.01)
    H04N 5/91     (2006.01)
(52) U.S. Cl. ......................................... 386/83; 386/46
(58) Field of Classification Search ................... 386/83, 386/46
    See application file for complete search history.

(56) References Cited

U.S. PATENT DOCUMENTS 6,311,011 B1 * 10/2001 Kuroda ........................ 386/46

FOREIGN PATENT DOCUMENTS

JP    09-135422 A1    5/1997

(Continued)

OTHER PUBLICATIONS

Notification of Transmittal of Translation of the International Preliminary Examination Report dated Feb. 20, 2004.

(Continued)

*Primary Examiner*—Robert Chevalier
*Assistant Examiner*—Anner Holder
(74) *Attorney, Agent, or Firm*—Westerman, Hattori, Daniels & Adrian, LLP.

(57) ABSTRACT

The MPU 17 issues, in program recording control, a control command to a stream recording/reproducing unit 4 so as to supply a partial TS outputted from a TS decoder 3a to an external recording device 31 through an IEEE 1394 interface 5. Here, the MPU 17 issues a control command so as to perform recording on a hard disk drive 6 which is a built-in recording device to the stream recording/reproducing unit 4 in a case where the external recording device 31 cannot be found and a case where situations where connection cannot be established, for example, arise.

3 Claims, 2 Drawing Sheets

FOREIGN PATENT DOCUMENTS

| | | | |
|---|---|---|---|
| JP | 10-172237 | A | 6/1998 |
| JP | 11-176082 | A | 7/1999 |
| JP | 2000-155998 | A1 | 6/2000 |
| JP | 2000-181786 | A1 | 6/2000 |
| JP | 2000-278639 | | 10/2000 |
| JP | 2000-278639 | A | 10/2000 |
| JP | 2000-278639 | A1 | 10/2000 |
| JP | 2000-293940 | | 10/2000 |
| JP | 2000-293940 | A1 | 10/2000 |
| JP | 2000-354226 | | 12/2000 |
| JP | 2001-148825 | A | 5/2001 |
| WO | WO92/22983 | * | 12/1992 |

OTHER PUBLICATIONS

International Search Report for PCT/JP02/06257 completed on Aug. 28, 2002.

Notice of International Preliminary Examination Report for PCT/JP02/06257 completed on May 19, 2003.

Response to International Preliminary Examination Report for PCT/JP02/06257 mailed on Jan. 14, 2003.

Office Action mailed Jul. 22, 2008 in Corresponding Japanese Patent Application No. 2001-195071.

* cited by examiner

DIGITAL BROADCASTING RECEIVING/RECORDING APPARATUS

TECHNICAL FIELD

The present invention relates to an apparatus that receives and records a digital broadcasting wave.

BACKGROUND ART

In a digital broadcasting receiving system using a satellite, for example, a video/audio signal is compressed using a digital signal compression technique, and a stream on which video/audio digital signals on a plurality of programs are time-division multiplexed (a transport stream) is broadcast via a transponder (a satellite relay). On the other hand, a broadcasting receiver for receiving such digital broadcasting selects by a tuner one of a plurality of transponders in digital broadcasting received through an antenna, selects by demultiplex processing one of a plurality of channels included in the one transponder, and decodes a digital signal on the selected channel, to output a video/audio signal.

In recent years, proposed as such a broadcasting receiver has been one containing a recording device such as a hard disk. Further, proposed has been one having an IEEE (Institute of Electrical and Electronics Engineers) 1394 mounted thereon as an interface to record a received program on a recording device such as an external D-VHS (Digital VHS).

However, the built-in recording device generally has a small storage capacity, and is not suited to store a lot of programs for a long time period. On the other hand, in a configuration in which recording is performed on the external recording device through the interface, a lot of programs can be stored for a long time period by replacing a tape or the like. However, there may arise such a problem that program recording cannot be performed because a user forgets to insert the tape or the like or the remaining amount of the tape is insufficient.

DISCLOSURE OF INVENTION

In view of the foregoing circumstances, an object of the present invention is to provide a digital broadcasting receiving and recording apparatus capable of performing program recording even when any problem arises in an external recording device.

In order to solve the above-mentioned problem, a digital broadcasting receiving and recording apparatus according to the present invention is characterized by comprising means for receiving a digital broadcasting wave to extract a program stream; means for recording the program stream on a built-in recording device; means for recording the program stream on an external recording device using an interface for transmitting and receiving data and control information to and from the external recording device; means for judging whether or not there is obstruction to execution of the recording on the basis of the control information provided from the external recording device; and control means for switching, in a case where it is judged that there is obstruction in the external recording device when the external recording device is caused to perform or to be performing program recording, the program recording performed by the external recording device to program recording performed by the built-in recording device.

In the above-mentioned configuration, the program recording can be performed on the external recording device through the interface. Accordingly, a lot of programs can be stored for a long time period. Even if there occurs any obstruction to recording because a user forgets to insert a tape or the like, or the remaining amount of the tape is insufficient, for example, the program recording performed by the external recording device can be switched to the program recording performed by the built-in recording device, thereby making it possible to solve such discontent that the program recording is terminated without being executed.

The digital broadcasting receiving and recording apparatus may comprise message output means for informing a user that a program which is scheduled to be recorded on the external recording device is recorded on the built-in recording device. Further, the digital broadcasting receiving and recording apparatus may be so configured that dubbing onto the external recording device from the built-in recording device in a case where the program which is scheduled to be recorded on the external recording device is recorded on the built-in recording device is executed by a one-button operation.

BEST MODE FOR CARRYING OUT THE INVENTION

A receiving and recording apparatus that receives digital broadcasting according to an embodiment of the present invention will be described on the basis of FIGS. 1 and 2.

Figure 1:
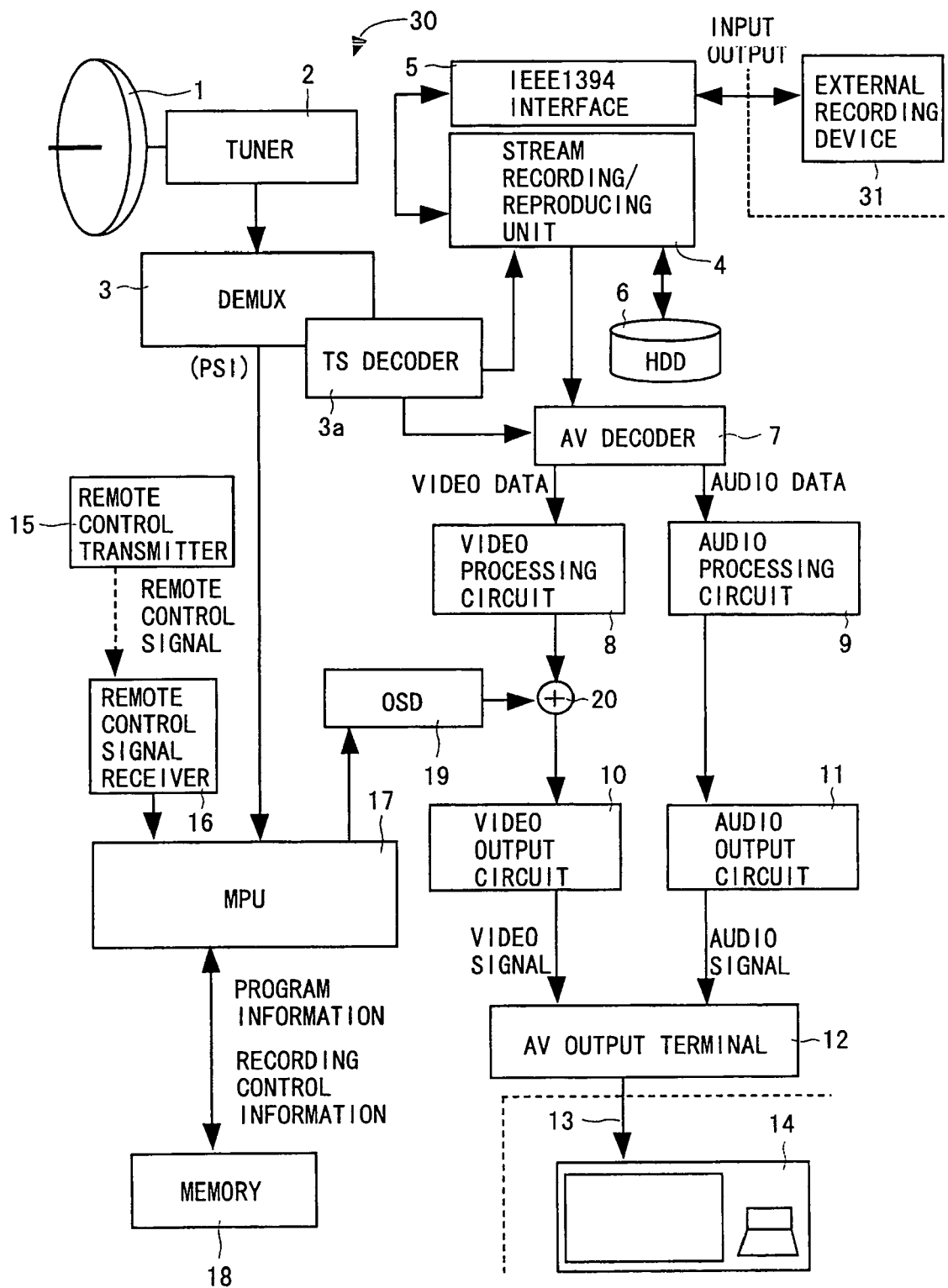
FIG. 1 is a block diagram showing a digital broadcasting receiving and recording apparatus according to an embodiment of the present invention.

In FIG. 1, an antenna 1 is arranged in a predetermined direction outdoors, and receives a digital broadcasting wave sent from a BS (Broadcasting via Satellite). The antenna 1 generally comprises a frequency converter, and inputs to a tuner 2 a signal which has been subjected to receiving/frequency conversion.

The tuner 2 extracts, out of received high-frequency digital modulation signals, the signal having a particular frequency. That is, it performs processing for selecting one of a plurality of transponders in digital broadcasting. Further, the tuner 2 comprises a demodulation circuit, an inverse interleave circuit, an error correcting circuit, and so forth, thereby demodulating the selected digital modulation signal to output a transport stream.

A demultiplexer (DEMUX) 3 separates the transport stream outputted by the tuner 2 into a video stream and an audio stream based on MPEG2 (Moving Picture Experts Group2), and PSI/SI (Program Specific Information/Service Information). A TS (Transport Stream) decoder 3a in the demultiplexer 3 extracts a transport stream constituting a program (hereinafter referred to as a partial TS) selected by a user on the basis of a command (a designated PID (Packet ID) ) from an MPU (Microprocessor Unit) 17, and inputs the partial TS to a stream recording/reproducing unit 4 and an AV decoder 7. As described in the prior art, a plurality of channels are multiplexed on the transport stream. Processing for selecting any one of the channels can be performed by extracting data indicating which PID in the transport stream is used to multiplex the arbitrary channel from the PSI/SI. The selection of the transport stream (the selection of the transponder) can be also made on the basis of information related to the PSI/SI. Further, service information (SI) includes program information (the contents of a program, the time when the program begins, a time period during which the program is continued, a genre code, etc.).

The stream recording/reproducing unit 4 can write (record) the partial TS outputted from the TS decoder 3a into a hard disk drive (HDD) 6 which is a built-in recording device, and can read out the partial TS from the hard disk drive 6 (reproduction). Further, the stream recording/reproducing unit 4 also inputs and outputs the partial TS through an IEEE 1394 interface 5 to and from an external recording device (a D-VHS, a hard disk, an MO (Magneto-Optic) disk, etc.) 31. A recording/reproduction command and an input/output command are also issued by the MPU 17.

The AV decoder 7 comprises a video decoder for decoding the video stream and an audio decoder for decoding the audio stream. The video decoder decodes an inputted variable length code to find a quantization factor and a motion vector, thereby carrying out inverse DCT (Discrete Cosine Transformation), motion compensation control based on the motion vector, and so forth. The audio decoder decodes an inputted coded signal, to generate audio data.

A video processing circuit 8 receives video data from the AV decoder 7 and subjects the received video data to D/A (Digital-to-Analog) conversion, to convert the video data into a composite signal in an NTSC (National Television System Committee) format, for example. An audio signal processing circuit 9 receives the audio data outputted from the AV decoder 7 and subjects the received audio data to D/A conversion, to generate an analog signal of a right (R) channel and an analog signal of a left (L) channel.

A video output circuit 10 and an audio output circuit 11 are constructed by comprising an output resistor, an amplifier, etc. An AV output terminal 12 is provided with an output unit (a set of a right/left audio output terminal or the like and a video output terminal). A monitor 14 comprising a display and a speaker is connected to the output unit by a video/audio cable 13.

An OSD (On-screen Display) circuit 19 outputs to an adder 20 bit map data based on character information and color information which it is instructed to output from the MPU 17. The adder 20 performs processing for superimposing a video based on the bit map data into a received video. EPG (Electronic Program Guide) screen display based on the PSI/SI received by the MPU 17, message display related to recording processing, and so forth are realized by the OSD circuit 19.

A remote control transmitter 15 is a transmitter for sending out a command to the digital broadcasting receiving and recording apparatus 30. When a key provided in the remote control transmitter 15 is operated, signal light (a remote control signal) meaning a command corresponding to the key is sent out from a light emitter which is not illustrated. A remote control signal receiver 16 receives the signal light emitted when the key in the remote control transmitter 15 is operated, converts the signal light into an electric signal, and inputs the electric signal to the MPU 17.

A memory (e.g., an EEPROM (Electrically Erasable and Programmable ROM)) 18 stores information for selecting a transponder, service information (the contents of a program, the time when the program begins, a time period during which the program is continued, genre information, etc.) utilized for a program guide, message data, recording reservation information, etc. by the processing of the MPU 17.

The MPU 17 carries out overall control in the digital broadcasting receiving and recording apparatus 30. Particularly, the following program recording control is carried out as control according to the present invention. In the program recording control, recording is basically performed using the external recording device 31, and a control command is issued to the stream recording/reproducing unit 4 so as to supply the partial TS outputted from the TS decoder 3a to the external recording device 31 through the IEEE 1394 interface 5.

Here, in a case where the external recording device 31 cannot be found, a case where there arise situations where connection cannot be established, for example, and further a case where it is judged that recording cannot be normally performed using commands such as "turn power on" and "confirm media information", the MPU 17 issues a control command to the stream recording/reproducing unit 4 so as to perform recording on the hard disk drive 6 which is a built-in recording device. Further, in the comparison of a time period during which a program is continued and the remaining amount of a D-VHS tape, which is one of confirmations of media information, examples of a method of judging the remaining amount of the tape include a method based on tape position information and a method of finding the remaining amount of the tape from a tape counter value at a final end of the tape on the basis of the current tape counter value. Further, the current tape counter value may be stored in the memory 18 for dubbing, described later.

Figure 2:
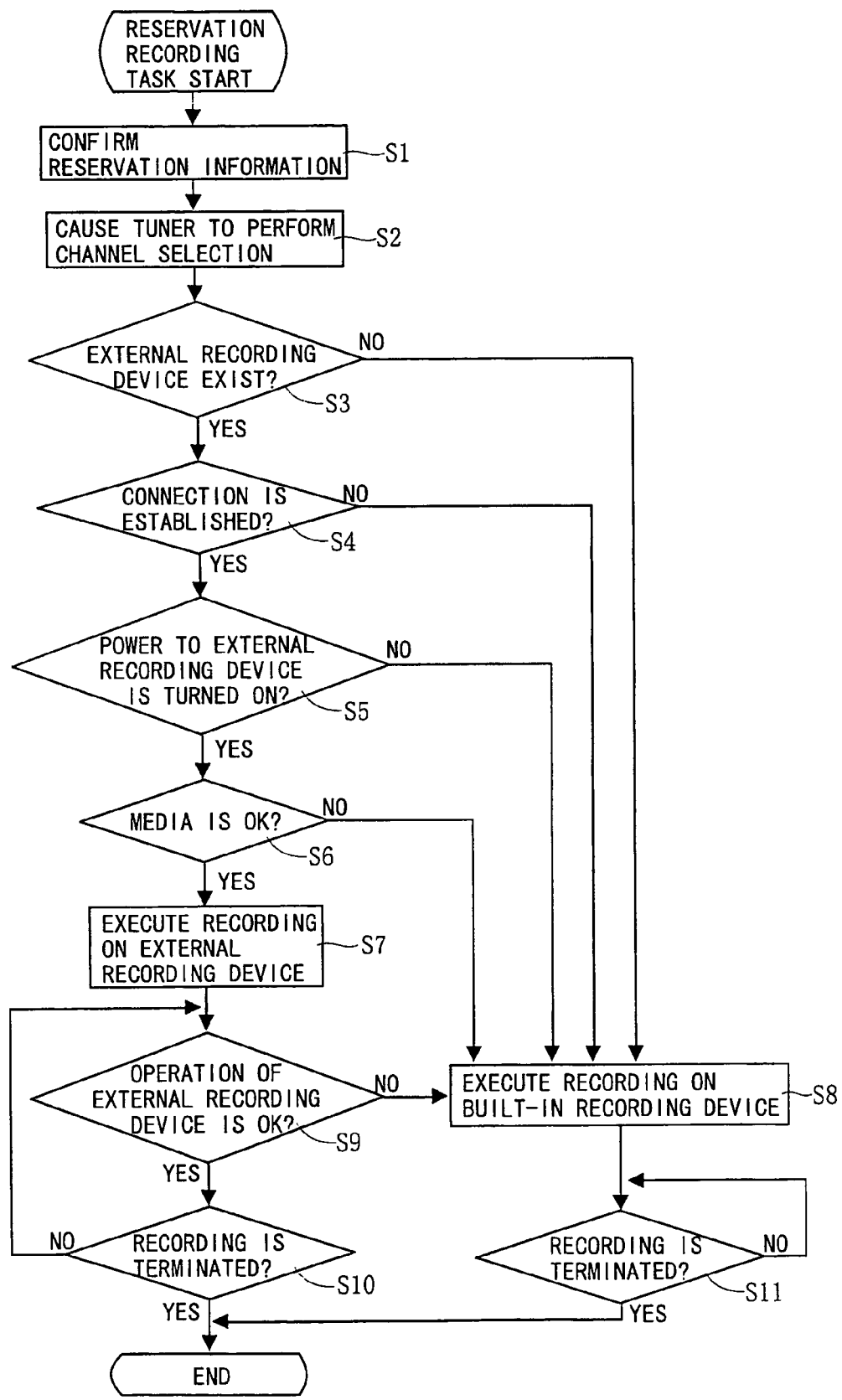
FIG. 2 is a flow chart showing the contents of recording control.

FIG. 2 is a flow chart showing an example of the contents of program recording control. First, recording reservation information (the time when a program begins, a channel, etc.) is read out of the memory 18 (step S1) and the tuner 2 is caused to perform a channel selection operation on the basis of the information (step S2). Confirmation whether or not the external recording device exists (step S3), confirmation whether or not the connection is established (step S4), confirmation whether or not the power to the external recording device is turned on (step S5), and confirmation of a media (step S5) are successively performed. When it is judged that recording is impossible in each of the confirmations, recording on the built-in hard disk 6 is executed (step S8). When it is judged that recording is possible in each of the confirmations, recording on the external recording device 31 is executed (step S7). Even after the execution, the power to the external recording device 31 and the other conditions are monitored (step S9). If any problem arises, the program recording on the external recording device is switched to the recording on the built-in hard disk 6 (step S8). If the recording is terminated (YES in steps S10 and S11), the control of the recording is terminated.

When the recording on the built-in hard disk 6 is executed, the starting point of recording is recorded on the hard disk 6 or the memory 18. In cases such as a case where a reproduction command is received, for example, a message indicating that the recording on the built-in hard disk 6 is executed is read out of the memory 18, and is displayed using the OSD display circuit 19. In this message, the name of a program, the time when the program is recorded, and further the reason why the program is recorded (the cause of recording) on the built-in hard disk 6, and recording conditions indicating whether or not the whole of the program is recorded on the built-in hard disk 6 or the time point where a part of the program is recorded (the time, the elapsed time since the start of the program, etc.) may be stored and displayed.

It is considered that the user desires to dub the program onto the external recording device 31 by seeing the message. When the whole of the program, together with the message, is recorded on the built-in hard disk 6 because no tape is loaded, for example, therefore, a message "Do you dub it? YES or NO (Please set a tape in the external recording device previous to the dubbing)" is also displayed. When "YES" is selected by a user's remote control operation, the MPU 17 reads out the partial TS from the starting point of recording in the hard disk 6 by the stream recording/reproducing unit 4 after confirming the state of the external recording device 31 through the IEEE 1394 interface 5, and gives the read partial TS to the external recording device 31 through the IEEE 1394 interface 5, to cause the external recording device 31 to perform recording. That is, dubbing onto the external recording device 31 is automatically executed by operating a "YES" button displayed on a screen When a part of the program is recorded on the built-in hard disk 6 because the remaining amount of the tape is insufficient, for example, a message "Do you dub it? YES or NO (We will receive data in the built-in hard disk from the current tape in the external recording device previous to the dubbing. After the receiving, a sound "peep" is produced. Therefore, please set a new tape after that.)" is also displayed. When "YES" is selected by the user, the MPU 17 causes the external recording device 31 to execute rewinding the tape through the IEEE 1394 interface 5. The ending point of the rewinding is the above-mentioned current tape counter value which is the tape position at the time when the recording is started. Reproduction is executed in the external recording device 31 after the rewinding, to record the reproduced partial TS on the hard disk 6 by the stream recording/reproducing unit 4. Thereafter, a sound "peep" is produced, the replacement of the tape in the external recording device 31 is confirmed, and the partial TS of the program recorded on the hard disk 6 is then reproduced beginning at its head and dubbed onto the external recording device 31. A key indicating "one-touch dubbing", for example, may be prepared in the remote control transmitter 15 irrespective of the "YES" and "NO" buttons on the screen, to automatically perform the above-mentioned dubbing operation when the key is operated.

There is a case where a program is recorded while being viewed without reserving the recording. Even in such a case, however, the program may be recorded on the built-in hard disk 6 when a problem arises in the external recording device 31.

As described in the foregoing, according to the present invention, the program recording is automatically performed in the internal recording device even when any problem arises in the external recording device, thereby producing the effect of preventing the problem that recording is not performed.

The invention claimed is:

1. A digital broadcasting receiving and recording apparatus comprising:
    means for receiving a digital broadcasting wave to extract a program stream;
    means for recording the program stream on a built-in recording device;
    means for recording the program stream on an external recording device using an interface for transmitting and receiving data and control information to and from the external recording device; and
    means for judging whether the program stream can be recorded on the external recording device on the basis of the control information provided from the external recording device;
    wherein the apparatus is arranged to switch automatically so as to record the program stream with the built-in recording device instead of the external recording device if it is judged before and during recording on the external recording device that such recording cannot be performed, and
    wherein, when a part of the program stream is recorded on the built-in recording device because a remaining capacity of the external recording device is insufficient, a reproduction is executed in the external recording device to record a reproduced partial program stream to the built-in recording device before dubbing the program stream from the built-in recording device to the external recording device.

2. The digital broadcasting receiving and recording apparatus according to claim 1, characterized by comprising
    message output means for informing a user that a program which is scheduled to be recorded on the external recording device is recorded on the built-in recording device.

3. The digital broadcasting receiving and recording apparatus according to claim 1 or 2, characterized in that
    dubbing onto the external recording device from the built-in recording device in a case where the program which is scheduled to be recorded on the external recording device is recorded on the built-in recording device is executed by a one-button operation.

* * * * *